United States Patent
Kim et al.

(10) Patent No.: US 8,359,042 B2
(45) Date of Patent: Jan. 22, 2013

(54) COMMUNICATION SYSTEM AND METHOD OF PERFORMING INTERFERENCE CONTROL USING RANDOM BEAMFORMING TECHNIQUE

(75) Inventors: Young-Doo Kim, Seoul (KR); Chan Soo Hwang, Yongin-si (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 12/509,864

(22) Filed: Jul. 27, 2009

(65) Prior Publication Data
US 2010/0227566 A1  Sep. 9, 2010

(30) Foreign Application Priority Data

Mar. 3, 2009 (KR) .................. 10-2009-0017955

(51) Int. Cl.
*H04W 72/00* (2009.01)
(52) U.S. Cl. .................. 455/452.2; 455/135; 455/161.3; 455/277.2
(58) Field of Classification Search .............. 455/452.2, 455/135, 161.3, 277.2, 24, 69, 126, 226.3; 370/332, 333
See application file for complete search history.

(56) References Cited

U.S. PATENT DOCUMENTS

| | | | | |
|---|---|---|---|---|
| 7,532,911 B2* | 5/2009 | Kwun et al. | ............ | 455/562.1 |
| 7,986,972 B2* | 7/2011 | Kim et al. | ............ | 455/562.1 |
| 2006/0039494 A1* | 2/2006 | Kim et al. | ............ | 375/267 |
| 2006/0209980 A1* | 9/2006 | Kim et al. | ............ | 375/267 |
| 2007/0298718 A1* | 12/2007 | Je et al. | ............ | 455/63.1 |
| 2008/0025336 A1* | 1/2008 | Cho et al. | ............ | 370/432 |
| 2008/0170523 A1* | 7/2008 | Han et al. | ............ | 370/310 |
| 2009/0011757 A1* | 1/2009 | Tenny | ............ | 455/425 |
| 2009/0016463 A1* | 1/2009 | Roh | ............ | 375/295 |
| 2009/0196254 A1* | 8/2009 | Cha et al. | ............ | 370/331 |
| 2009/0207822 A1* | 8/2009 | Kim et al. | ............ | 370/338 |
| 2009/0215480 A1* | 8/2009 | Kim et al. | ............ | 455/501 |
| 2009/0245169 A1* | 10/2009 | Zhang et al. | ............ | 370/328 |
| 2009/0286563 A1* | 11/2009 | Ji et al. | ............ | 455/501 |
| 2010/0040012 A1* | 2/2010 | Uchishima | ............ | 370/329 |
| 2010/0091798 A1* | 4/2010 | Bhushan et al. | ............ | 370/474 |
| 2010/0112952 A1* | 5/2010 | Molnar et al. | ............ | 455/63.1 |

(Continued)

FOREIGN PATENT DOCUMENTS

KR  10-2005-0067336  7/2005

(Continued)

OTHER PUBLICATIONS

Viveck R. Cadambe et al., "Interference Alignment and Degrees of Freedom of the K-User Interference Channel," IEEE Transactions on Information Theory, Aug. 2008, vol. 54, No. 8, pp. 3425-3441.

(Continued)

*Primary Examiner* — Dominic E Rego
(74) *Attorney, Agent, or Firm* — NSIP Law

(57) ABSTRACT

Provided is a communication system using various types of random beamforming technologies. Each of terminals that belong to a user group may generate a decoding matrix, based on interference caused by a neighboring base station of a serving base station. Each of the terminals may transmit, to the serving base station or the neighboring base station, information associated with a signal-to-interference plus noise ratio (SINR) or throughput based on the decoding matrix. The serving base station may select, from the terminals, at least one target terminal to communicate with the serving base station.

25 Claims, 10 Drawing Sheets

U.S. PATENT DOCUMENTS

| | | | |
|---|---|---|---|
| 2010/0165932 A1* | 7/2010 | Wan et al. | 370/329 |
| 2010/0182967 A1* | 7/2010 | Zorba Barah et al. | 370/329 |
| 2010/0227613 A1* | 9/2010 | Kim et al. | 455/434 |
| 2010/0278059 A1* | 11/2010 | Wu et al. | 370/252 |
| 2011/0170518 A1* | 7/2011 | Randriamasy et al. | 370/331 |
| 2011/0237193 A1* | 9/2011 | Shen et al. | 455/41.2 |

FOREIGN PATENT DOCUMENTS

| | | |
|---|---|---|
| KR | 10-2007-0052511 | 5/2007 |
| KR | 10-2008-0017239 | 2/2008 |
| KR | 10-2008-0021494 | 3/2008 |
| KR | 10-2008-0074419 | 8/2008 |
| KR | 10-2008-0086726 | 9/2008 |

OTHER PUBLICATIONS

Krishna Gomadam et al., "Approaching the Capacity of Wireless Networks through Distributed Interference Alignment," 2008, IEEE, pp. 1-6.

* cited by examiner

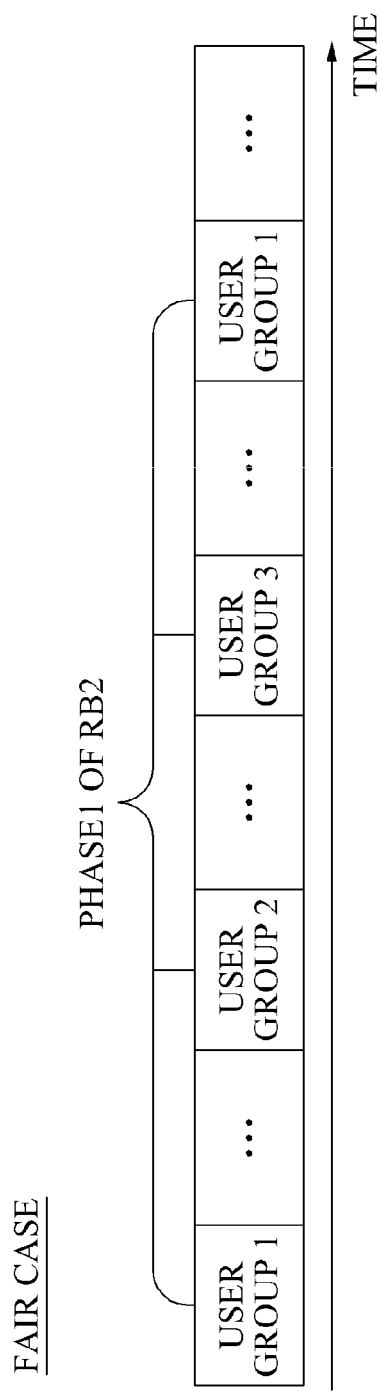

COMMUNICATION SYSTEM AND METHOD OF PERFORMING INTERFERENCE CONTROL USING RANDOM BEAMFORMING TECHNIQUE

CROSS-REFERENCE TO RELATED APPLICATION(S)

This application claims the benefit under 35 U.S.C. §119 (a) of a Korean Patent Application No. 10-2009-0017955, filed on Mar. 3, 2009, in the Korean Intellectual Property Office, the entire disclosure of which is incorporated herein by reference for all purposes.

BACKGROUND

1. Field

The following description relates to a technology that may more effectively control or align interference in a communication system having a plurality of base stations.

2. Description of the Related Art

The rapid development of communication systems having a plurality of base stations includes modifying and enhancing data transmission rates and communication reliability. The base stations may include a cellular base station, a femto base station, a fixed base station, a mobile base station, and the like, and may denote a transmitter to transmit data.

The base stations may communicate with a user group that includes a single corresponding user or a plurality of users using the same radio resource, for example, a frequency, a time, a code resource, and the like. In such a case, interference may occur in the user group. Due to the interference, a throughput may decrease. For example, in a communication system having base stations 1, 2, and 3 and corresponding user groups 1, 2, and 3, respectively, the user group 2 may be subject to interference caused by signals from the base stations 1 and 3.

Accordingly, research is being conducted regarding interference control technologies and interference alignment technologies which may enhance the usage efficiency of radio resources, and may also reduce the decrease in a throughput caused by the interference. Since the interference control technologies or the interference alignment technologies may increase the overhead in a communication system, methods of optimizing the interference control technologies and/or the interference alignment technologies may be needed.

SUMMARY

In one general aspect, a method of operating a terminal that belongs to a user group corresponding to a serving base station, includes generating a decoding matrix for extracting a desired signal that is transmitted from the serving base station, based on interference from at least one neighboring base station that is adjacent to the serving base station, and feeding back, to the serving base station, information associated with the quality of the desired signal that is calculated based on the generated decoding matrix.

Information associated with the quality of the desired signal may include information associated with a signal-to-interference plus noise (SINR) or information associated with a throughput between the serving base station and the terminal.

The generating of the decoding matrix may include generating the decoding matrix according to a decoding scheme having a predetermined criterion. The decoding scheme may include a zero-forcing decoding scheme or a maximum SINR (Max SINR) decoding scheme.

Each of the serving base station and the at least one neighboring base station may use an arbitrarily determined precoding matrix.

The serving base station may select, from the user group based on information associated with the quality of the desired signal, at least one target terminal to communicate with the serving base station. The serving base station may select the at least one target terminal based on an SINR of the desired signal in each of a plurality of terminals belonging to the user group, or a maximum value of throughput with respect to each of the terminals.

The method may further include calculating a throughput between the serving base station and the terminal based on the generated decoding matrix, wherein information associated with the quality of the desired signal includes information associated with the calculated throughput.

In another general aspect, a method of operating a terminal that belongs to a user group corresponding to a serving base station, includes generating a decoding matrix for extracting a desired signal that is transmitted from the serving base station, based on interference from at least one neighboring base station that is adjacent to the serving base station having a plurality of candidate precoding matrices, calculating the quality of the desired signal with respect to each of the candidate precoding matrices using the generated decoding matrix, and feeding back, to the serving base station or the at least one neighboring base station, information associated with the quality of the desired signal and information associated with at least one matrix among the plurality of candidate preceding matrices.

The at least one neighboring base station may determine, as a preceding matrix of the at least one neighboring base station, at least one matrix among the plurality of candidate preceding matrices. The serving base station may select, from the user group based on information associated with the quality of the desired signal, at least one target terminal to communicate with the serving base station.

Information associated with the quality of the desired signal may include information associated with an SINR of the desired signal or information associated with a throughput between the serving base station and the terminal.

At least one matrix among the plurality of candidate preceding matrices may be determined based on the quality of the desired signal.

Neighboring terminals that belong to a neighboring user group corresponding to the at least one neighboring base station may calculate information associated with the quality of a desired signal of the neighboring terminals based on interference from the serving base station and another neighboring base station, and feed back, to the at least one neighboring base station, information associated with the quality of the desired signal of the neighboring terminals.

Where a priority is assigned to the neighboring base user group, the neighboring terminals may generate information associated with the quality with respect to the plurality of candidate preceding matrices included in the serving base station and the other neighboring base station.

The at least one neighboring base station may select, from the neighboring user group based on information associated with the quality of the desired signal of the neighboring terminals, at least one terminal to communicate with the at least one neighboring base station.

In still another general aspect, a terminal that belongs to a user group corresponding to a serving base station, includes a decoding matrix generation unit to generate a decoding matrix to extract a desired signal that is transmitted from the serving base station, based on interference from at least one neighboring base station that is adjacent to the serving base station, and a feedback unit to feed back, to the serving base station, information associated with the quality of the desired signal that is calculated based on the generated decoding matrix.

The serving base station may select, from the user group based on information associated with the quality of the desired signal, at least one target terminal to communicate with the serving base station.

The terminal may further include a throughput calculation unit to calculate a throughput between the serving base station and the terminal based on the generated decoding matrix, wherein information associated with the quality of the desired signal includes information associated with the calculated throughput.

In still another general aspect, a terminal that belongs to a user group corresponding to a serving base station, includes a decoding matrix generation unit to generate a decoding matrix to extract a desired signal that is transmitted from the serving base station, based on interference from at least one neighboring base station that is adjacent to the serving base station having a plurality of candidate preceding matrices, a signal quality calculation unit to calculate the quality of the desired signal with respect to each of the candidate preceding matrices using the generated decoding matrix, and a feedback unit to feed back, to the serving base station or the at least one neighboring base station, information associated with the quality of the desired signal and information associated with at least one matrix among the plurality of candidate preceding matrices.

The at least one neighboring base station may determine, as a preceding matrix of the at least one neighboring base station, at least one matrix among the plurality of candidate preceding matrices, and the serving base station may select, from the user group based on information associated with the quality of the desired signal, at least one target terminal to communicate with the serving base station.

The decoding matrix generation unit may include an interference estimation unit to estimate interference from the at least one neighboring base station that is adjacent to the serving base station.

In still another general aspect, a serving base station corresponding to a user group including a plurality of terminals, includes a pilot transmitter to transmit a pilot using a preceding matrix, a receiver to receive information associated with the quality of a desired signal of each of the terminals, and a selection unit to select, from the plurality of terminals based on information associated with the quality of the desired signal of each of the terminals, a target terminal to communicate with the serving base station. The plurality of terminals may generate a decoding matrix for extracting the desired signal, based on interference from at least one neighboring base station that is adjacent to the serving base station, and may also feed back information associated with the quality of the desired signal based on the generated decoding matrix.

The selection unit may select the target terminal based on a maximum value of throughput with respect to each of the terminals or an SINR of the desired signal in each of the terminals.

The pilot transmitter may transmit the pilot using an arbitrarily determined preceding matrix.

Other features and aspects will be apparent from the following detailed description, the drawings, and the claims.

BRIEF DESCRIPTION OF THE DRAWINGS

FIGS. 5A and 5B are diagrams illustrating exemplary scenarios applicable to a communication system using a second random beamforming technology.

Figure 1:
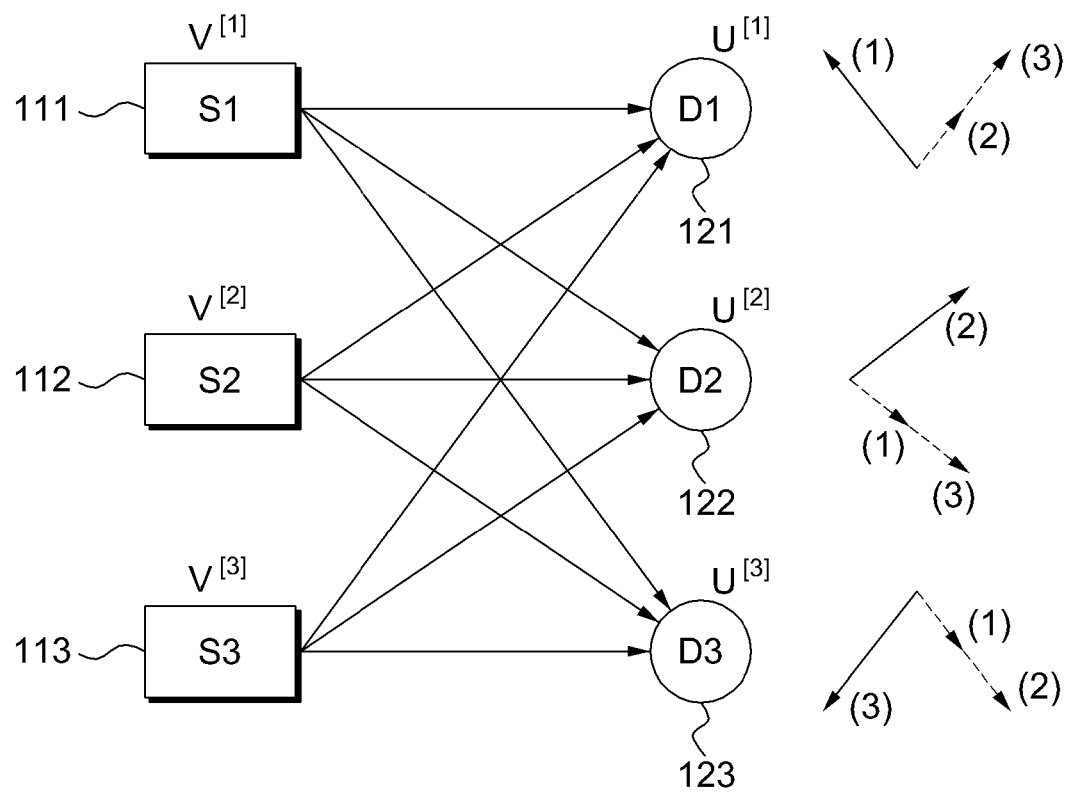
FIG. 1 is a diagram illustrating an exemplary communication system using an interference alignment technology which is a type of an interference control scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

FIG. 1 illustrates an exemplary communication system using an interference alignment technology which is a type of an interference control scheme.

Referring to FIG. 1, the communication system or a communication network includes source nodes 111, 112, and 113, (i.e., S1, S2, S3, respectively). Each of the source nodes (S1, S2, S3) 111, 112, and 113 may correspond to each of destination nodes 121, 122, and 123 (i.e., D1, D2, D3, respectively).

Each of the source nodes (S1, S2, S3) 111, 112, and 113 denotes a data transmission device that includes a fixed base station, a mobile base station, a miniature base station such as a femto base station, a relay station, and the like. Each of the destination nodes (D1, D2, D3) 121, 122, and 123 denotes a data reception device that includes a relay station, a fixed terminal, a mobile terminal, and the like.

Where each of the source nodes (S1, S2, S3) 111, 112, and 113 transmits data using the same radio resource, interference may occur in each of the destination nodes (D1, D2, D3) 121, 122, and 123. For example, in the destination node (D1) 121, a signal of the source node (S1) 111 corresponds to a desired signal and signals of the source nodes (S2, S3) 112 and 113 correspond to interference. Similarly, interference may occur even in the destination nodes (D2, D3) 122 and 123. The above interference may decrease a throughput of the communication system.

The decrease in the throughput caused by the interference may be prevented using an interference control scheme or an interference alignment technology. For example, the source nodes (S1, S2, S3) 111, 112, and 113 may adjust a phase of a signal using precoding matrices $V^{[1]}$, $V^{[2]}$, and $V^{[3]}$, respectively. A signal of each of the source nodes (S1, S2, S3) 111, 112, and 113 with the adjusted phase may be transmitted via channels formed between the source nodes (S1, S2, S3) 111, 112, and 113 and the destination nodes (D1, D2, D3) 121, 122, and 123. A received signal of each of the destination nodes (D1, D2, D3) 121, 122, and 123 may be separated into a desired signal and interference.

Further to the example, it is assumed here that arrow indicators (1), (2), and (3) of FIG. 1 denote a desired signal of the destination nodes (D1, D2, D3) 121, 122, and 123, respectively. A received signal of the destination node (D1) 121 may be separated into a desired signal (1) of the destination node (D1) 121, and interference (2) and (3). A received signal of the destination node (D2) 122 may be separated into a desired signal (2) of the destination node (D2) 122, and interference (1) and (3). A received signal of the destination node (D3) 123 may be separated into a desired signal (3) of the destination node (D3) 123, and interference (1) and (2).

The destination nodes (D1, D2, D3) 121, 122, and 123 may cancel interference in the received signal to extract the desired signal using decoding matrices $U^{[1]}$, $U^{[2]}$, and $U^{[3]}$, respectively. For example, the source nodes (S1, S2, S3) 111, 112, and 113 may use the precoding matrices $V^{[1]}$, $V^{[2]}$, and $V^{[3]}$, respectively. The destination nodes (D1, D2, D3) 121, 122, and 123 may use the decoding matrices $U^{[1]}$, $U^{[2]}$, and $U^{[3]}$, respectively. Accordingly, a usage efficiency of radio resources may be enhanced and a decrease in throughput of the communication system caused by the interference may be prevented.

Although the expression, precoding matrices $V^{[1]}$, $V^{[2]}$, and $V^{[3]}$, and decoding matrices $U^{[1]}$, $U^{[2]}$, and $U^{[3]}$, is used here for ease of description, it is understood that the precoding matrices $V^{[1]}$, $V^{[2]}$, and $V^{[3]}$ and the decoding matrices $U^{[1]}$, $U^{[2]}$, and $U^{[3]}$ may be in a matrix or vector form. For example, the precoding matrices $V^{[1]}$, $V^{[2]}$, and $V^{[3]}$ and the decoding matrices $U^{[1]}$, $U^{[2]}$, and $U^{[3]}$ may have the matrix or vector form according to a number of data streams of each of the source nodes (S1, S2, S3) 111, 112, and 113.

Where the communication system uses the interference control scheme or the interference alignment technology, a large amount of overhead may occur.

For example, in a frequency division duplex (FDD) environment, each of the source nodes (S1, S2, S3) 111, 112, and 113 may need to share information associated with a channel regarding a desired signal and interference channels. Specifically, in order to perform the interference alignment scheme, the source node (S3) 113 may need to verify information associated with channels of the source node (S2) 112 and channels of the source node (S1) 111 as well as information associated with channels of the source node (S3) 113 and thereby generate the precoding matrix $V^{[3]}$. Due to the above channel information sharing process, overhead may occur.

As another example, in a time division duplex (TDD) environment, the source nodes (S1, S2, S3) 111, 112, and 113, and the destination nodes (D1, D2, D3) 121, 122, and 123 may generate the precoding matrices $V^{[1]}$, $V^{[2]}$, and $V^{[3]}$, and the decoding matrices $U^{[1]}$, $U^{[2]}$, and $U^{[3]}$, respectively, using an iterative scheme. Using the iterative scheme may also increase overhead in the communication system.

Where a number of transmit-receive pairs between source nodes and destination nodes is K, for example, K=3 in FIG. 1, and the interference alignment scheme is ideally used, a communication system applying an FDD scheme may achieve a sum rate of K/2 $\log_2(1+\text{SNR})$, and a communication system applying a TDD scheme may achieve a sum rate of about K/2 $\log_2(1+\text{SNR})$ at a high signal-to-noise ratio (SNR).

Figure 2:
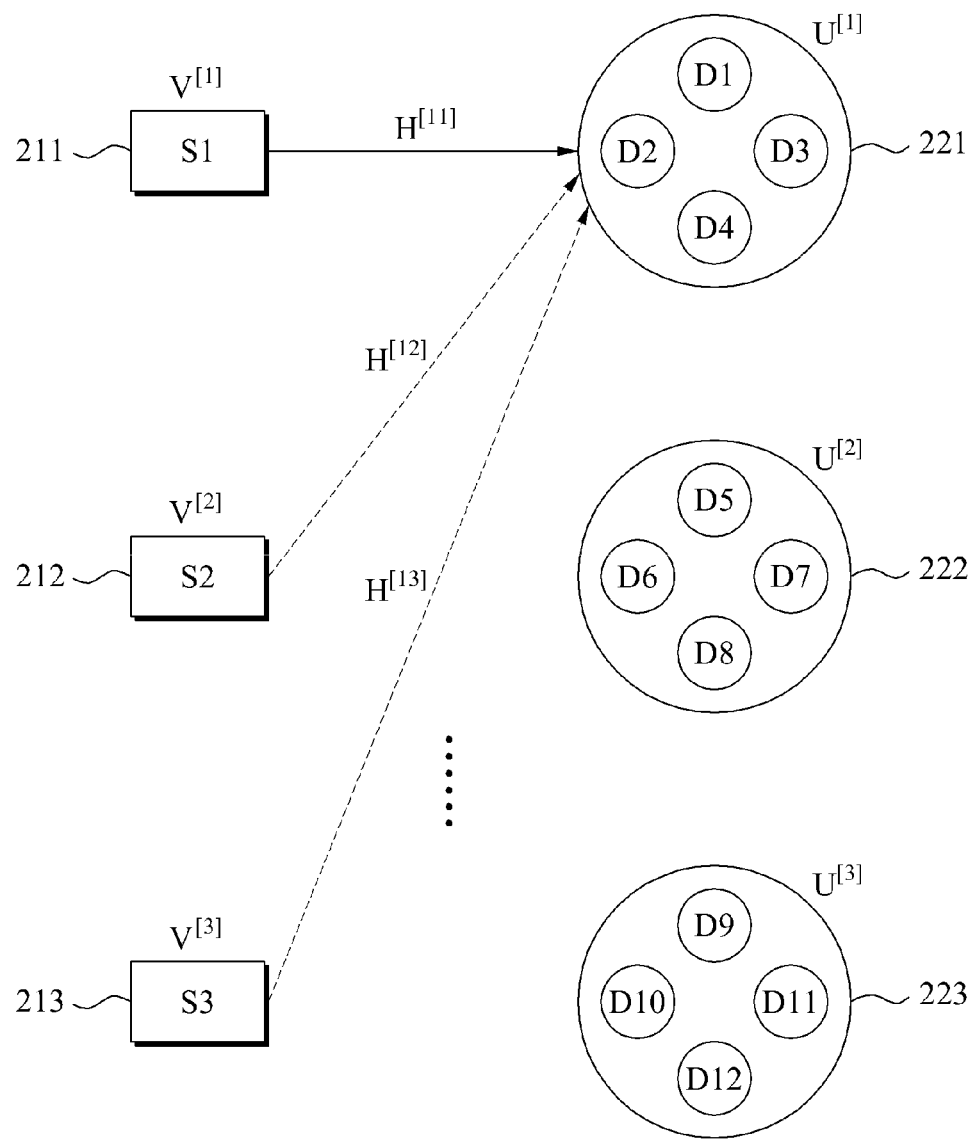
FIG. 2 is a diagram illustrating an exemplary communication system using a first random beamforming technology.

FIG. 2 illustrates an exemplary communication system using a first random beamforming technology.

Referring to FIG. 2, it is assumed that the communication system includes three source nodes (S1, S2, S3) 211, 212, and 213, and three user groups 221, 222, and 223. The three user groups 221, 222, and 223 correspond to the three source nodes 211, 212, and 213, respectively. Each of the user groups 221, 222, and 223 may include four destination nodes, for example, D1, D2, D3, and D4, and D5, D6, D7, and D8, and D9, D10, D11, and D12.

The following description is directed to an exemplary first random beamforming technology.

Where the source nodes (S1, S2, S3) 211, 212, and 213 transmit data using the same radio resource, and each of the user groups 221, 222, and 223 includes a plurality of destination nodes, each of the destination nodes belonging to the same user group may have a different signal-to-interference plus noise ratio (SINR) or throughput.

For example, among the destination nodes D1, D2, D3, and D4 belonging to the user group 221, the destination node D1 may have a highest SINR or throughput and the destination node D3 may have a lowest SINR or throughput.

Although the source nodes (S1, S2, S3) 211, 212, and 213 may share information associated with all the channels, or may not retrieve precoding matrices or decoding matrices through an iterative scheme in order to use an interference control scheme or an interference alignment technology, it is possible to enhance a sum rate of the communication system by constructing the destination node D1 and the source node (S1) 211 as a transmit-receive pair. For example, since nodes to communicate with the source nodes (S1, S2, S3) 211, 212, and 213 may be selected from the user groups 221, 222, and 223, it is possible to enhance the sum rate of the communication system while causing little overhead. That is, as a number of destination nodes included in the user groups 221, 222, and 223 increases, it may be highly probable to further increase the sum rate of the communication system.

In a first operation regarding the first random beamforming, each of the source nodes (S1, S2, S3) 211, 212, and 213 may randomly determine a corresponding precoding matrix, which may indicate that the source nodes (S1, S2, S3) 211, 212, and 213 have no need to share information associated with the corresponding precoding matrix. For example, since each of the source nodes (S1, S2, S3) 211, 212, and 213 does not require information associated with precoding matrices of other source nodes, overhead may be decreased.

A corresponding precoding matrix $V^{[k]}$ may be determined to satisfy a constraint of the following Equation 1.

$$V^{[k]H}V^{[k]} = I_{d^{[k]}}$$ [Equation 1]

Here, k denotes an index of the source nodes (S1, S2, S3) 211, 212, and 213 corresponding to transmit nodes, and $d^{[k]}$ denotes a number of data streams or a rank of a $k^{th}$ transmit node. Hereinafter, it is assumed that an index of destination nodes is j.

In a second operation regarding the first random beamforming, all the destination nodes D1, D2, D3, D4, D5, D6, D7, D8, D9, D10, D11, and D12 belonging to the user groups 221, 222, and 223, respectively, may estimate interference. For example, interference of the destination node D2 belonging to the user group 221 may be $H^{[12]}V^{[2]}$ and $H^{[13]}V^{[3]}$.

In a third operation regarding the first random beamforming, each of all the destination nodes D1, D2, D3, D4, D5, D6, D7, D8, D9, D10, D11, and D12 belonging to the user groups 221, 222, and 223, respectively, may generate a decoding matrix U based on the estimated interference according to a predetermined decoding scheme. The decoding matrix U may be generated according to a constraint of the following Equation 2.

$$U^{[j]^H} U^{[j]} = I_{\bar{d}^{[j]}}$$ [Equation 2]

Where the index j has a value from 1 to 4, $\bar{d}^{[j]}$ has the same value as $d^{[1]}$. Where the index j has a value from 5 to 8, $\bar{d}^{[j]}$ has the same value as $d^{[2]}$. Where the index j has a value from 9 to 12, $\bar{d}^{[j]}$ has the same value as $d^{[3]}$.

The destination nodes D1, D2, D3, D4, D5, D6, D7, D8, D9, D10, D11, and D12 belonging to the user groups 221, 222, and 223 may have various types of decoding schemes. For example, each of the decoding schemes may have a unique criterion. The destination nodes D1, D2, D3, D4, D5, D6, D7, D8, D9, D10, D11, and D12 may generate decoding matrices according to different criteria. As a further example, the destination nodes D1, D2, D3, D4, D5, D6, D7, D8, D9, D10, D11, and D12 may use a zero-forcing decoding scheme or a maximum SINR (Max SINR) decoding scheme.

For example, where the destination node D2 uses the zero-forcing decoding scheme, a covariance matrix Q with respect to interference in the destination node D2 may be expressed by the following Equation 3.

$$Q = \sum_{j=2}^{3} \frac{P^{[j]}}{d^{[j]}} H^{[1,j]} V^{[1,j]} V^{[1,j]^H} H^{[1,j]^H}$$ [Equation 3]

Where $d^{[j]}$ is 1, the destination node D2 may generate, as a decoding matrix or vector, a unique vector corresponding to a smallest unique value of the covariance matrix Q. Since the Max SINR decoding scheme is a decoding scheme known to one of ordinary skill in the art, detailed description related thereto will be omitted here for conciseness.

Each of the destination nodes D1, D2, D3, D4, D5, D6, D7, D8, D9, D10, D11, and D12 belonging to the user groups 221, 222, and 223 may generate a decoding matrix and then generate information associated with the quality of a desired signal. Accordingly, information associated with the quality of the desired signal may include SINR information or throughput information. For example, each of the destination nodes D1, D2, D3, D4, D5, D6, D7, D8, D9, D10, D11, and D12 may calculate the SINR or the throughput based on the decoding matrix.

Also, each of the destination nodes D1, D2, D3, D4, D5, D6, D7, D8, D9, D10, D11, and D12 belonging to the user groups 221, 222, and 223 may feed back the generated quality information to a corresponding source node.

In a fourth operation regarding the first random beamforming, where SINR information or throughput information is fed back to the source nodes (S1, S2, S3) 211, 212, and 213, each of the source nodes (S1, S2, S3) 211, 212, and 213 may select at least one destination node to communicate with the corresponding source node from the plurality of destination nodes D1, D2, D3, D4, D5, D6, D7, D8, D9, D10, D11, and D12. Each of the source nodes (S1, S2, S3) 211, 212, and 213 may select any one destination node corresponding to a maximum SINR or a maximum throughput with respect to the user groups 221, 222, and 223.

For example, the source node (S1) 211 may select the destination node D2 from the user group 221. The source node (S2) 212 may select the destination node D6 from the user group 222. The source node (S3) 213 may select the destination node D9 from the user group 223. Accordingly, the source node (S1) 211 and the destination node D2 may be constructed as a pair. Also, the source node (S2) 212 and the destination node D6 may be constructed as a pair. The source node (S3) 213 and the destination node D9 may be constructed as a pair.

For example, the source nodes (S1, S2, S3) 211, 212, and 213 may achieve the same performance as or a similar performance to a performance of the interference control scheme or the interference alignment technology without a need for information associated with interference channels. That is, it is possible to predict that a sum rate of the communication system may increase as a number of destination nodes included in the user groups 221, 222, and 223 increases.

The following description is directed to an exemplary second random beamforming technology.

Figure 3:
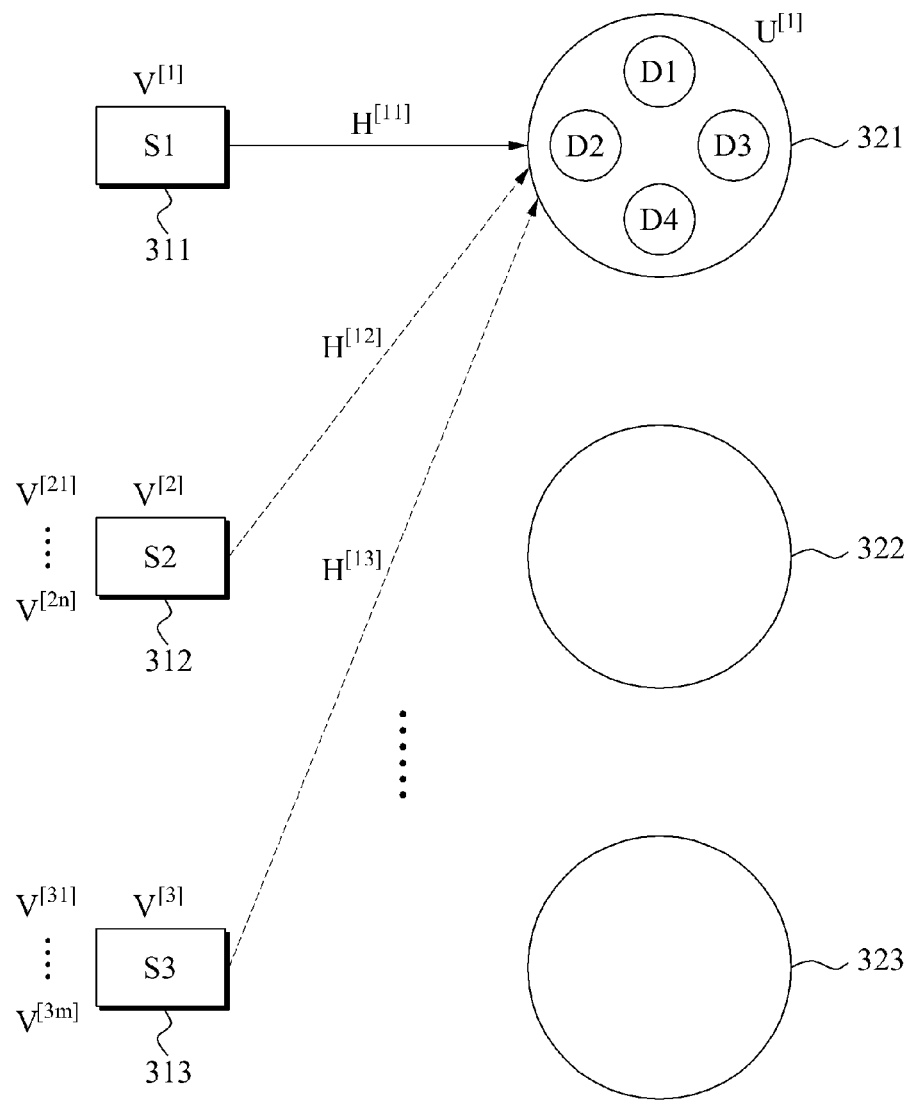
FIG. 3 is a diagram illustrating an exemplary communication system using a second random beamforming technology in a phase 1.

FIG. 3 illustrates an exemplary communication system using a second random beamforming technology in a phase 1.

In a first phase (phase 1) regarding the second random beamforming, source nodes (S2, S3) 312 and 313 may include a plurality of candidate preceding matrices. The plurality of candidate preceding matrices may also satisfy the constraint of the above Equation 1. For example, the source node (S2) 312 may include n candidate precoding matrices $V^{[21]}, V^{[22]}, \ldots, V^{[2n]}$, and the source node (S3) 313 may include m candidate preceding matrices $V^{[31]}, V^{[32]}, \ldots, V^{[3m]}$. In this case, n×m combinations may constitute interference that may occur in a destination D2 that belongs to a user group 321.

Each of destination nodes D1, D2, D3, and D4 that belong to the user group 321 may estimate n×m interference, and may calculate n x m decoding matrices based on the estimated interference. The destination nodes D1, D2, D3, and D4 belonging to the user group 321 may calculate an SINR or throughput using the calculated decoding matrices.

Also, each of the destination nodes D1, D2, D3, and D4 belonging to the user group 321 may verify a candidate preceding matrix corresponding to a maximum SINR or throughput. An index of the candidate preceding matrix corresponding to the maximum SINR or throughput may be fed back to the source node (S1) 311 or the source nodes (S2, S3) 312 and 313. The destination nodes D1, D2, D3, and D4 belonging to the user group 321 may feed back, to the source node (S1) 311, information associated with the quality of the maximum SINR or throughput.

The source node (S1) 311 may select a destination node corresponding to the maximum SINR or throughput, and may verify the fed back index of candidate precoding matrices. Each of the candidate precoding matrices with the verified index may be determined as a precoding matrix of each of the source nodes (S2, S3) 312 and 313.

According to an aspect, any one of the n candidate preceding matrices $V^{[21]}, V^{[22]}, \ldots, V^{[2n]}$ may be determined as a precoding matrix $V^{[2]}$ of the source node (S2) 312. Any one of the m candidate precoding matrices $V^{[31]}, V^{[32]}, \ldots, V^{[3m]}$ may be determined as a precoding matrix $V^{[3]}$ of the source node (S3) 313. It may be possible to decrease interference that may occur in the destination nodes D1, D2, D3, and D4 belonging to the user group 321 by increasing the number of candidate precoding matrices.

A process of selecting at least one destination node from destination nodes belonging to other user groups 322 and 323 may be performed in second phase (phase 2) of the second random beamforming.

Figure 4:
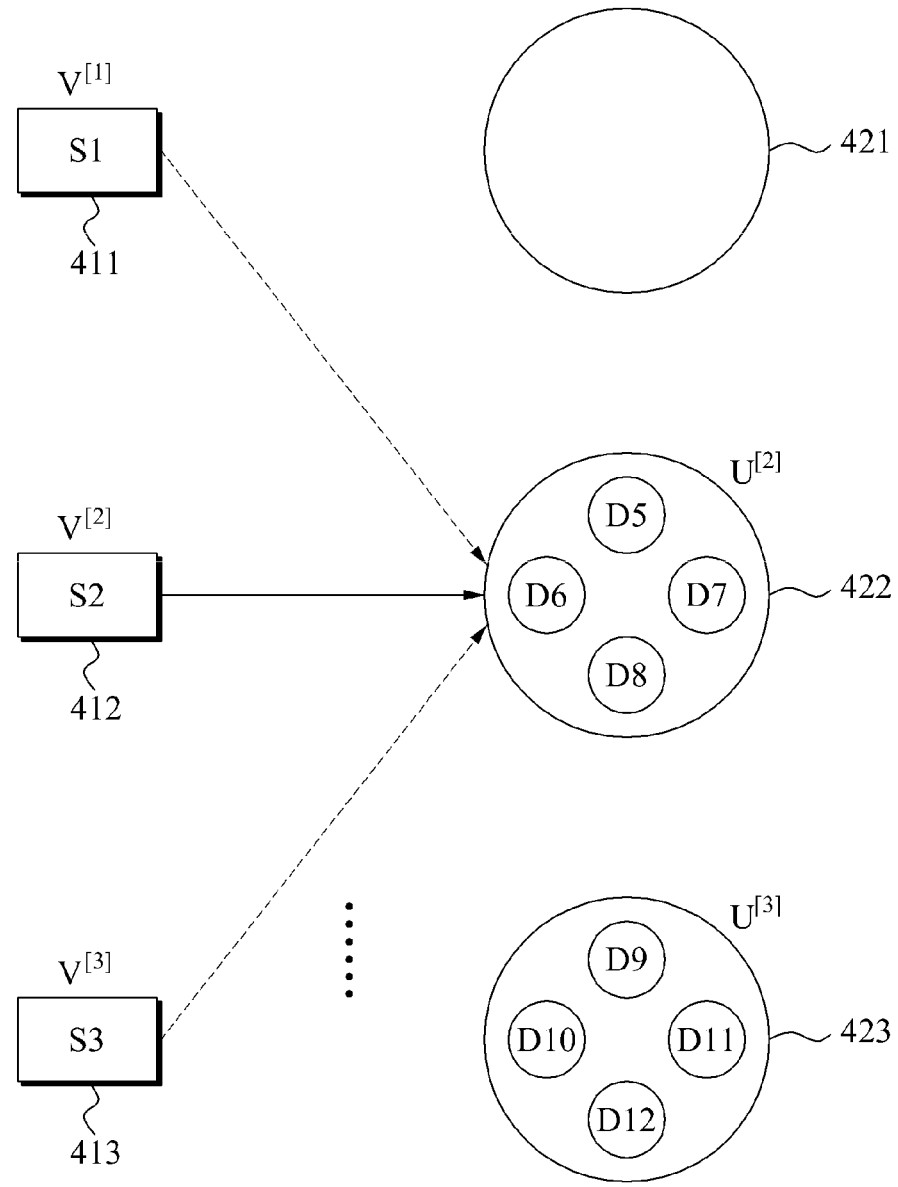
FIG. 4 is a diagram illustrating an exemplary communication system using a second random beamforming technology in a phase 2.

FIG. 4 illustrates an exemplary communication system using a second random beamforming technology in the phase 2.

In the second phase (phase 2) regarding the second random beamforming, referring to FIG. 4, where any one destination node is selected from a user group 421 through the above phase 1, a process of selecting any one destination node from each of user groups 422 and 423 may be performed consecutively or in parallel.

The first beamforming technology described above with reference to FIG. 2 may be applied to the second phase (phase 2) of the second random beamforming.

For example, destination nodes D5, D6, D7, and D8 belonging to the user group 422 may estimate interference from source nodes (S1, S3) 411 and 413, and may generate decoding matrices. The destination nodes D5, D6, D7, and D8 belonging to the user group 422 may feed back an SINR or throughput to the source node (S2) 412 based on the generated decoding matrices. The source node (S2) 412 may select any one destination node from the user group 422 based on the fed back SINR or throughput.

Also, the user group 423 and the source node (S3) 413 may perform the same operation as the operation of the user group 422 and the source node (S2) 412 to thereby select any one destination node from the user group 423.

Figure 5B:
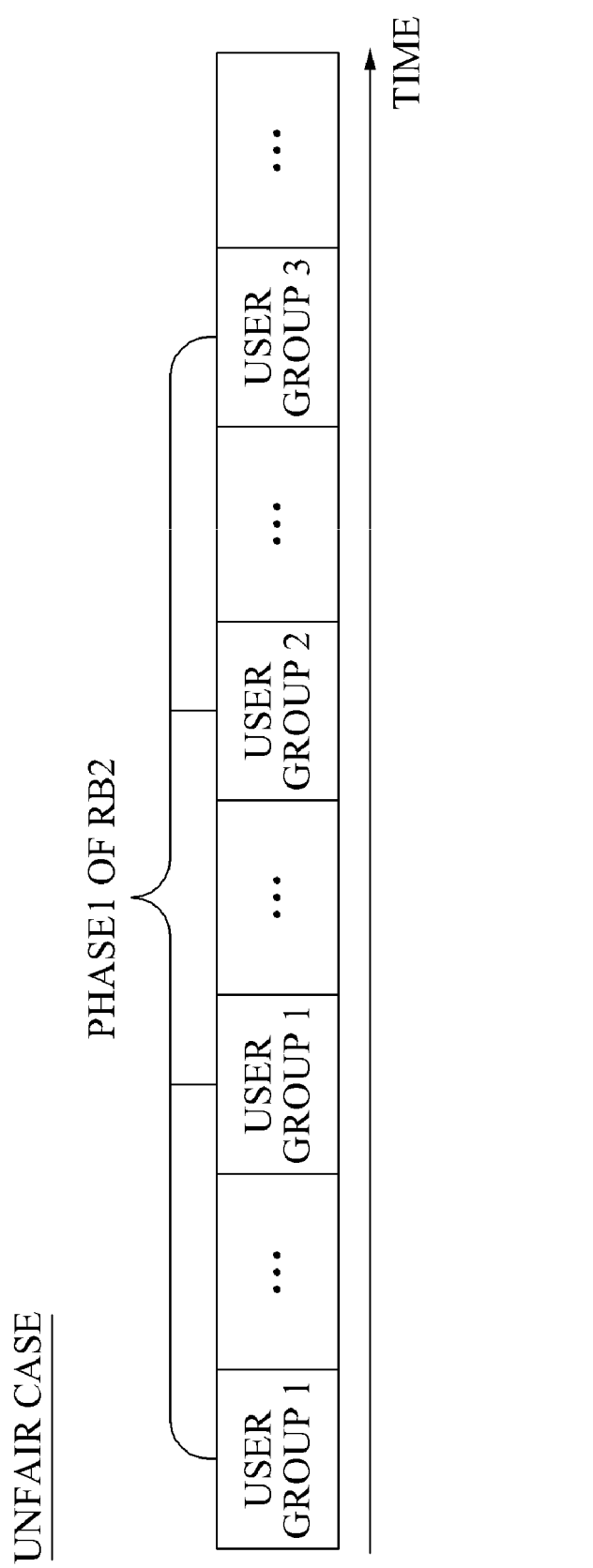

FIGS. 5A and 5B illustrate scenarios applicable to an exemplary communication system using a second random beamforming technology.

Referring to FIGS. 5A and 5B, the communication system using the second random beamforming technology may predict various types of scenarios, and provide an optimized solution.

Referring again to FIG. 4, it may be predicted that the user group 421 capable of averagely testing a plurality of candidate preceding matrices in the communication system using the second random beamforming technology has a relatively high throughput in comparison to the other user groups 422 and 423. Based on this aspect, the communication system may reasonably assign an opportunity to increase the throughput to user groups.

Referring to FIG. 5A, the communication system may fairly assign the opportunity capable of increasing the throughput to all the user groups (user group 1, user group 2, user group 3). For example, the user groups (user group 1, user group 2, user group 3) may sequentially and fairly perform the phase 1 of the second random beamforming technology. Here, to perform the phase 1 of the second random beamforming technology may indicate that an opportunity to test the plurality of candidate precoding matrices is obtained.

Referring to FIG. 5B, where it is desired to further enhance a throughput of a user group 1, a separate priority may be assigned to the user group 421. Accordingly, a user group 2 and a user group 3 may perform the phase 1 of the second random beamforming technology once, whereas the user group 421 may perform the phase 1 of the second random beamforming technology twice.

Figure 6:
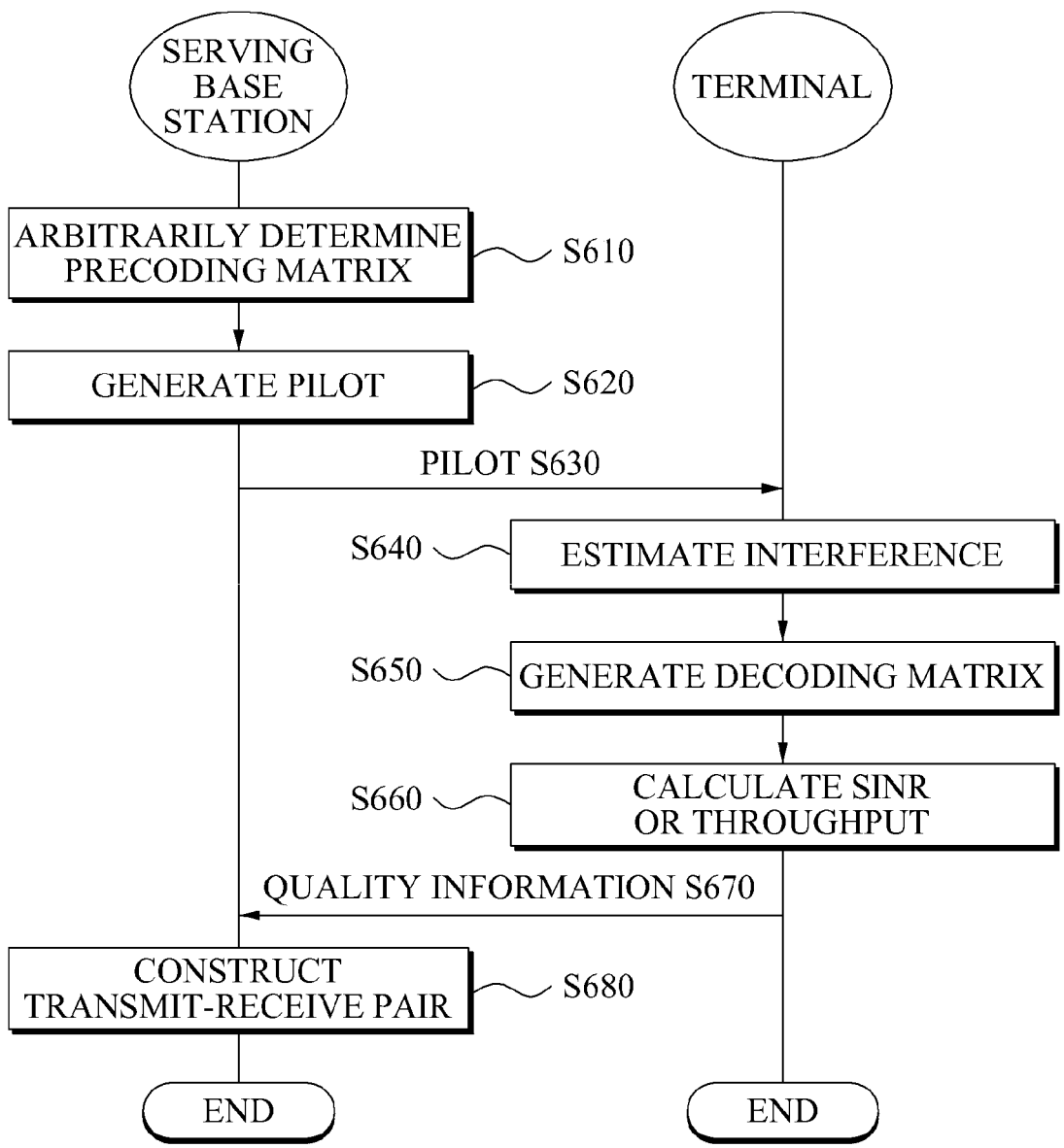
FIG. 6 is a flowchart illustrating an exemplary operation of a terminal and a serving base station using a first random beamforming technology.

FIG. 6 is a flowchart illustrating an exemplary operation of a terminal and a serving base station using a first random beamforming technology.

Referring to FIG. 6, the serving base station arbitrarily determines a precoding matrix in operation S610.

In operation S620, the serving base station generates a pilot (i.e. a pilot signal). In operation S630, the serving base station transmits the pilot to user groups. Although not illustrated in FIG. 6, neighboring base stations adjacent to the serving base station may also arbitrarily determine a precoding matrix and transmit a pilot to the user groups using the arbitrarily determined precoding matrix.

Each of the user groups may correspond to each of base stations, and includes a plurality of terminals. For example, referring again to FIG. 2, the user group 221 may have the source node (S1) 211 as a serving base station. The source nodes (S2, S3) 212 and 213 adjacent to the source node (S1) 211 that is the serving base station with respect to the user group 221 may be referred to as neighboring base stations. The user groups 222 and 223 which correspond to the source node nodes (S2, S3) 212 and 213 that are the neighboring base stations may be referred to as neighboring user groups of the user group 221.

In operation S640, a terminal that belongs to the user group which corresponds to the serving base station estimates interference based on the pilot that is transmitted from the neighboring base stations.

In operation S650, the terminal that belongs to the user group corresponding to the serving base station generates a decoding matrix based on interference of the neighboring base stations. For example, the terminal may generate the decoding matrix according to a decoding scheme having a unique criterion such as a zero-forcing decoding scheme or a Max SINR decoding scheme.

In operation S660, the terminal calculates an SINR of a desired signal or a throughput between the serving base station and the terminal. In operation S670, the terminal feeds back, to the serving base station, information associated with the SINR or throughput as quality information.

Although not illustrated in FIG. 6, all the terminals that belong to the user group may feed back, to the serving base station, information associated with the quality of the terminals. In operation S680, the serving base station constructs a transmit-receive pair by selecting, from the user group based on the quality information, at least one target terminal to communicate with the serving base station. For example, the serving base station may construct the transmit-receive pair based on an SINR of the desired signal in each of the terminals, or a maximum value of throughput with respect to each of the terminals.

Figure 7:
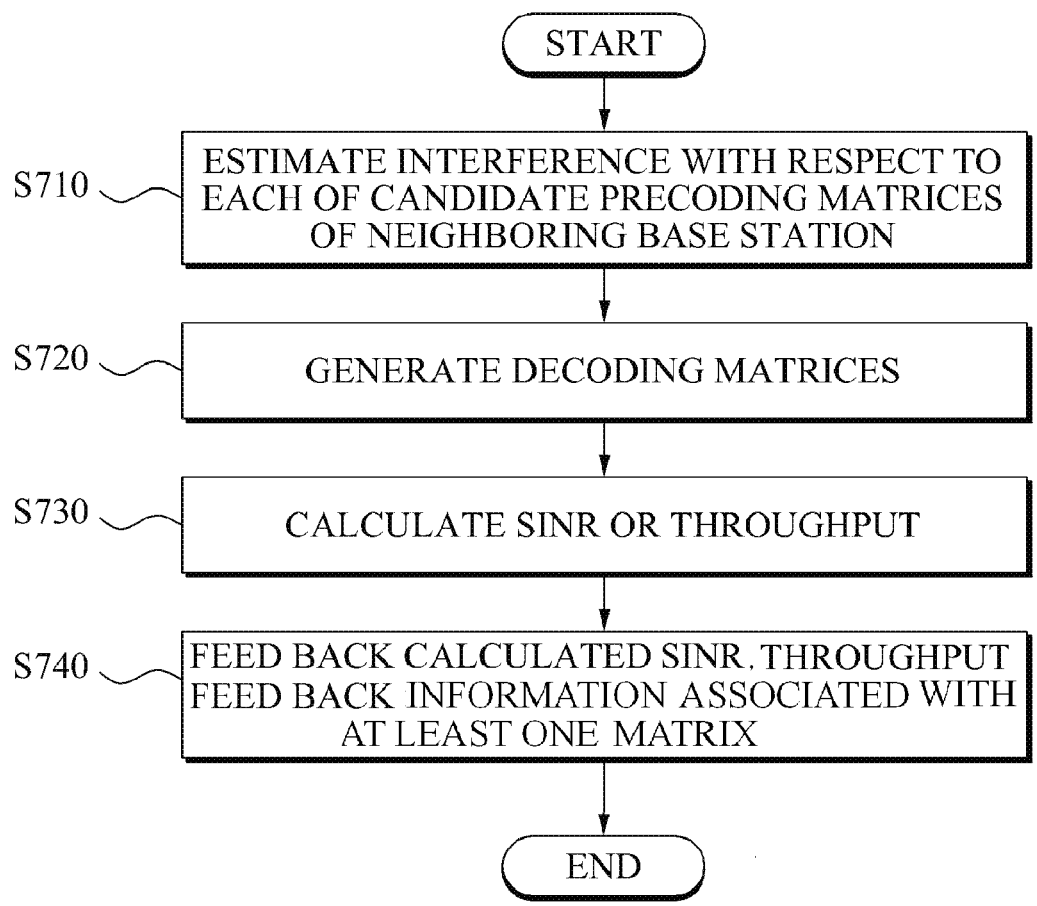
FIG. 7 is a flowchart illustrating an exemplary method of operating a terminal using a second random beamforming technology.

FIG. 7 is a flowchart illustrating an exemplary method of operating a terminal using a second random beamforming technology.

In operation S710, the terminal estimates interference from a neighboring base station. The neighboring base station may include a plurality of candidate preceding matrices.

In operation S720, the terminal generates decoding matrices to extract a desired signal that is transmitted from the serving base station, based on the estimated interference. A number of decoding matrices to be generated may be determined according to a number of candidate preceding matrices included in the neighboring base station.

In operation S730, the terminal calculates an SINR or throughput with respect to each of the candidate preceding matrices, using the generated decoding matrices.

In operation S740, the terminal feeds back, to the serving base station or the neighboring base station, the SINR or throughput, and information associated with at least one matrix among the plurality of candidate preceding matrices.

For example, the terminal may feed back, to the serving base station or the neighboring base station, a Max SINR or throughput, and information, for example, index information, associated with a matrix corresponding to the Max SINR or throughput among the plurality of candidate preceding matrices.

The serving base station may select, from a plurality of terminals belonging to a user group, a terminal corresponding to the Max SINR or throughput as a target terminal to communicate with the serving base station. The serving base station may determine a matrix corresponding to the Max SINR or throughput as the preceding matrix of the serving base station.

The neighboring base station may construct a transmit-receive pair according to the first random beamforming technology. For example, neighboring terminals belonging to the neighboring user group may calculate the decoding matrix based on interference from the serving base station and another neighboring base station. The neighboring terminals may calculate quality information and feed back the quality information to the neighboring base station. The neighboring base station may select a neighboring terminal corresponding to the Max SINR or throughput from the plurality of neighboring terminals.

Also, as described above with reference to FIG. 5, a priority may be assigned to user groups. For example, where the priority is assigned to a neighboring user group, a phase 1 of a random beamforming technology may be performed with respect to the neighboring user group.

Accordingly, the serving base station and the other neighboring base station may include a plurality of candidate preceding matrices. Neighboring terminals belonging to the neighboring user group may calculate the SINR or throughput that is quality information with respect to the plurality of candidate preceding matrices. Each of the neighboring terminals may feed back, to the serving base station or the other neighboring base station, the Max SINR or throughput and information associated with the matrix corresponding to the Max SINR or throughput among the plurality of candidate preceding matrices. The neighboring base station may select a neighboring terminal corresponding to the Max SINR or throughput. Each of the serving base station and the other neighboring base station may determine, as its preceding matrix, the matrix corresponding to the Max SINR or throughput. Referring again to FIG. 2, where the serving base station is the source node (S1) 211, the neighboring base station may be the source node (S2) 212 and the other neighboring base station may be the source node (S3) 213. The neighboring user group may be the user group 222.

Figure 8:
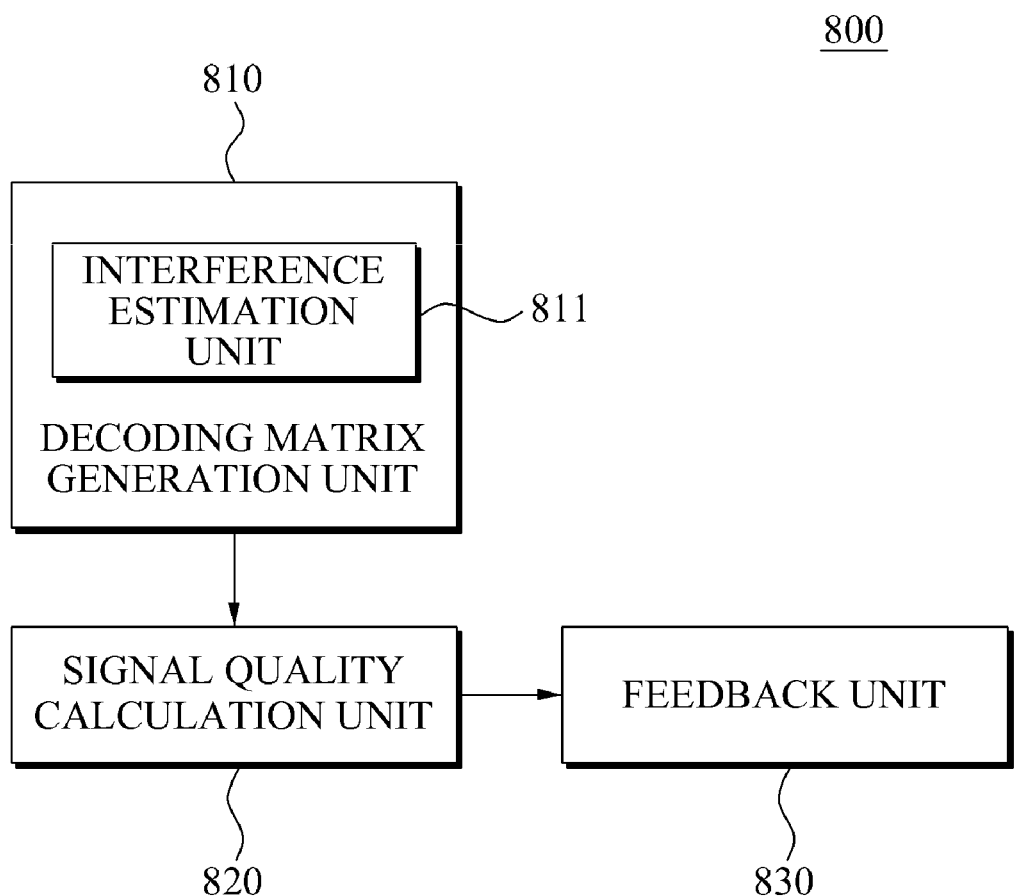
FIG. 8 is a block diagram illustrating a configuration of an exemplary terminal.

FIG. 8 illustrates a configuration of an exemplary terminal 800.

Referring to FIG. 8, the terminal 800 includes a decoding matrix generation unit 810, a signal quality calculation unit 820, and a feedback unit 830. The decoding matrix generation unit 810 may include an interference estimation unit 811.

The interference estimation unit 811 may estimate interference from at least one neighboring base station that is adjacent to a serving base station. Each of the at least one neighboring base station and the serving base station may use an arbitrarily determined precoding matrix.

The decoding matrix generation unit 810 may generate a decoding matrix to extract a desired signal that is transmitted from the serving base station, based on the estimated interference. The decoding matrix generation unit 810 may use various types of decoding schemes such as a zero-forcing decoding scheme, a Max SINR decoding scheme, and the like.

The signal quality calculation unit 820 may calculate quality information such as an SINR or throughput using the decoding matrix.

The feedback unit 830 may feed back the quality information to the serving base station.

The serving base station may select at least one target terminal to communicate with the serving base station, based on an SINR of a desired signal in each of terminals belonging to a user group and a maximum value of throughput with respect to each of the terminals.

Where the terminal uses the second beamforming technology, an operation of the decoding matrix generation unit 810, the interference estimation unit 811, and the signal quality calculation unit 820 may be changed.

For example, where the terminal uses the second beamforming technology, the neighboring base station may include a plurality of candidate precoding matrices. Accordingly, the interference estimation unit 811 may estimate interference with respect to the plurality of candidate precoding matrices.

The decoding matrix generation unit 810 may generate decoding matrices with respect to the plurality of candidate precoding matrices based on the estimated interference. The signal quality calculation unit 820 may calculate an SINR or throughput with respect to each of the generated decoding matrices. The feedback unit 830 may feed back, to the serving base station or the neighboring base station, information associated with a matrix corresponding to a Max SINR or throughput among the plurality of candidate precoding matrices, and the Max SINR or throughput.

Figure 9:
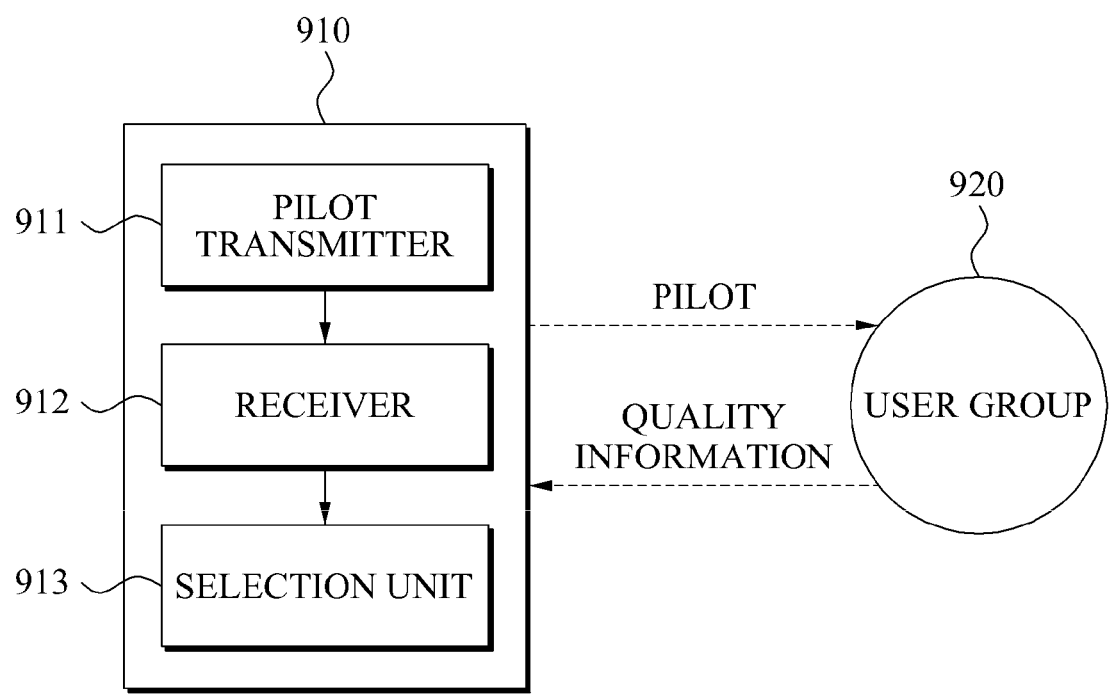
FIG. 9 is a block diagram illustrating a configuration of an exemplary serving base station.

FIG. 9 illustrates a configuration of an exemplary serving base station 910.

Referring to FIG. 9, the serving base station 910 includes a pilot transmitter 911, a receiver 912, and a selection unit 913.

The pilot transmitter 911 may transmit a pilot to a plurality of user groups including a user group 920, using a precoding matrix.

Accordingly, each of terminals that belong to the user group 920 may generate a decoding matrix to extract a desired signal, based on interference from at least one neighboring base station that is adjacent to the serving base station 910. Each of the terminals may feed back, to the serving base station 910, quality information that is calculated using the generated decoding matrix.

The receiver 912 may receive the quality information. The selection unit 913 may select, from the plurality of terminals based on the quality information, a target terminal to communicate with the serving base station 910.

Above descriptions regarding FIGS. 1 through 7 may be applicable to the terminal 800 of FIG. 8 and the serving base station 910 of FIG. 9, and thus further detailed descriptions related thereto will be omitted for conciseness.

According to example(s) described above, a sum rate of a communication system may be enhanced and overhead decreased.

According to example(s) described above, a terminal may perform interference control or interference alignment with reduced overhead, using a random beamforming technology.

Also, according to example(s) described above, a terminal may feed back an SINR or throughput to a serving base station using a decoding matrix that is calculated based on interference. The serving base station may constitute a transmit-receive pair based on the fed back information to thereby enhance the performance of a communication system.

According to example(s) described above, a serving base station and a neighboring base station may perform interference control or interference alignment without sharing channel information corresponding to the interference control or the interference alignment.

The methods described above including a terminal and a serving base station operating method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a terminal that belongs to a user group corresponding to a serving base station, the method comprising:
   generating a decoding matrix to extract a desired signal that is transmitted from the serving base station, based on interference from at least one neighboring base station that is adjacent to the serving base station; and
   feeding back, to the serving base station, information associated with the quality of the desired signal that is calculated based on the generated decoding matrix.

2. The method of claim 1, wherein information associated with the quality of the desired signal includes information associated with a signal-to-interference plus noise ratio (SINR) or information associated with a throughput between the serving base station and the terminal.

3. The method of claim 1, wherein the serving base station selects at least one target terminal to communicate with based on the information associated with the quality of the desired signal.

4. The method of claim 3, wherein the serving base station selects the at least one target terminal based on an SINR of the desired signal in each of a plurality of terminals belonging to the user group, or a maximum value of throughput with respect to each of the terminals.

5. The method of claim 1, wherein the generating of the decoding matrix comprises generating the decoding matrix according to a decoding scheme having a predetermined criterion.

6. The method of claim 5, wherein the decoding scheme includes a zero-forcing decoding scheme or a maximum SINR (Max SINR) decoding scheme.

7. The method of claim 1, wherein each of the serving base station and the at least one neighboring base station uses an arbitrarily determined precoding matrix.

8. The method of claim 1, further comprising:
   calculating a throughput between the serving base station and the terminal based on the generated decoding matrix,
   wherein information associated with the quality of the desired signal includes information associated with the calculated throughput.

9. A method of a terminal that belongs to a user group corresponding to a serving base station, the method comprising:
   generating a decoding matrix to extract a desired signal that is transmitted from the serving base station, based on interference from at least one neighboring base station that is adjacent to the serving base station having a plurality of candidate precoding matrices;
   calculating the quality of the desired signal with respect to each of the candidate precoding matrices using the generated decoding matrix; and
   feeding back, to the serving base station or the at least one neighboring base station, information associated with the quality of the desired signal and information associated with at least one matrix among the plurality of candidate precoding matrices.

10. The method of claim 9, wherein:
    the at least one neighboring base station determines, as a precoding matrix of the at least one neighboring base station, at least one matrix among the plurality of candidate precoding matrices, and
    the serving base station selects at least one target terminal to communicate with based on the information associated with the quality of the desired signal.

11. The method of claim 9, wherein information associated with the quality of the desired signal includes information associated with an SINR of the desired signal or information associated with a throughput between the serving base station and the terminal.

12. The method of claim 9, wherein at least one matrix among the plurality of candidate precoding matrices is determined based on the quality of the desired signal.

13. The method of claim 10, wherein neighboring terminals that belong to a neighboring user group corresponding to the at least one neighboring base station calculate information associated with the quality of a desired signal of the neighboring terminals based on interference from the serving base station and another neighboring base station, and feed back, to the at least one neighboring base station, information associated with the quality of the desired signal of the neighboring terminals.

14. The method of claim 13, wherein, where a priority is assigned to the neighboring base user group, the neighboring terminals generate information associated with the quality with respect to the plurality of candidate precoding matrices included in the serving base station and the other neighboring base station.

15. The method of claim 13, wherein the at least one neighboring base station selects at least one terminal to communicate with based on the information associated with the quality of the desired signal of the neighboring terminals.

16. A computer-readable recording medium storing a program to operate a terminal that belongs to a user group corresponding to a serving base station, the medium comprising instructions to cause a computer to:
    generate a decoding matrix to extract a desired signal that is transmitted from the serving base station, based on interference from at least one neighboring base station that is adjacent to the serving base station; and feed back, to the serving base station, information associated with the quality of the desired signal that is calculated based on the generated decoding matrix.

17. A terminal that belongs to a user group corresponding to a serving base station, the terminal comprising:
   a decoding matrix generation unit to generate a decoding matrix to extract a desired signal that is transmitted from the serving base station, based on interference from at least one neighboring base station that is adjacent to the serving base station; and
   a feedback unit to feed back, to the serving base station, information associated with the quality of the desired signal that is calculated based on the generated decoding matrix.

18. The terminal of claim 17, wherein the serving base station selects at least one target terminal to communicate with based on the information associated with the quality of the desired signal.

19. The terminal of claim 17, further comprising:
   a throughput calculation unit to calculate a throughput between the serving base station and the terminal based on the generated decoding matrix,
   wherein information associated with the quality of the desired signal includes information associated with the calculated throughput.

20. A terminal that belongs to a user group corresponding to a serving base station, the terminal comprising:
   a decoding matrix generation unit to generate a decoding matrix to extract a desired signal that is transmitted from the serving base station, based on interference from at least one neighboring base station that is adjacent to the serving base station having a plurality of candidate precoding matrices;
   a signal quality calculation unit to calculate the quality of the desired signal with respect to each of the candidate precoding matrices using the generated decoding matrix; and
   a feedback unit to feed back, to the serving base station or the at least one neighboring base station, information associated with the quality of the desired signal and information associated with at least one matrix among the plurality of candidate precoding matrices.

21. The terminal of claim 20, wherein:
   the at least one neighboring base station determines, as a precoding matrix of the at least one neighboring base station, at least one matrix among the plurality of candidate precoding matrices, and
   the serving base station selects at least one target terminal to communicate with based on the information associated with the quality of the desired signal.

22. The terminal of claim 20, wherein the decoding matrix generation unit comprises:
   an interference estimation unit to estimate interference from the at least one neighboring base station that is adjacent to the serving base station.

23. A serving base station corresponding to a user group including a plurality of terminals, the serving base station comprising:
   a pilot transmitter to transmit a pilot using a precoding matrix;
   a receiver to receive information associated with the quality of a desired signal of each of the terminals; and
   a selection unit to select, a target terminal to communicate with the serving base station based on information associated with the quality of the desired signal of each of the plurality of terminals,
   wherein each of the plurality of terminals generates a decoding matrix to extract the desired signal, based on interference from at least one neighboring base station that is adjacent to the serving base station, and feeds back information associated with the quality of the desired signal based on the generated decoding matrix.

24. The serving base station of claim 23, wherein the selection unit selects the target terminal based on a maximum value of throughput with respect to each of the terminals or an SINR of the desired signal in each of the terminals.

25. The serving base station of claim 23, wherein the pilot transmitter transmits the pilot using an arbitrarily determined precoding matrix

* * * * *